(12) United States Patent
Lucidarme et al.

(10) Patent No.: US 7,454,204 B2
(45) Date of Patent: Nov. 18, 2008

(54) METHOD OF ACCESSING RESOURCES OF A RADIOCOMMUNICATION SYSTEM, MOBILE TERMINAL AND BASE STATION FOR THE IMPLEMENTATION OF THE METHOD

(75) Inventors: Thierry Lucidarme, Montigny le Bretonneux (FR); Nidham Ben Rached, Paris (FR)

(73) Assignee: Alcatel Lucent, Paris (FR)

( * ) Notice: Subject to any disclaimer, the term of this patent is extended or adjusted under 35 U.S.C. 154(b) by 0 days.

(21) Appl. No.: 10/889,482

(22) Filed: Jul. 12, 2004

(65) Prior Publication Data

US 2005/0030919 A1    Feb. 10, 2005

(30) Foreign Application Priority Data

Jul. 23, 2003    (FR)    .................... 03 08985

(51) Int. Cl.
*H04Q 7/20*    (2006.01)

(52) U.S. Cl. .................................. 455/434

(58) Field of Classification Search ... 455/414.1–414.2, 455/456.1, 456.6, 455, 422.1, 434, 435
See application file for complete search history.

(56) References Cited

U.S. PATENT DOCUMENTS

| | | | |
|---|---|---|---|
| 5,625,627 A | 4/1997 | Ishi | |
| 6,047,182 A * | 4/2000 | Zadeh et al. | 455/440 |
| 6,192,247 B1 * | 2/2001 | Dillon et al. | 455/446 |
| 6,324,406 B1 * | 11/2001 | Zadeh | 455/456.2 |
| 2001/0038619 A1 * | 11/2001 | Baker et al. | 370/335 |

FOREIGN PATENT DOCUMENTS

| | | |
|---|---|---|
| WO | WO 95/08896 | 3/1995 |
| WO | WO 01/01613 | 1/2001 |

OTHER PUBLICATIONS

TS 25.213, Version 3.7.0, "Spreading and modulation (FDD)", published in Dec. 2001 by the 3GPP.
TS 25.211, Version 5.4.0, "Physical channels and mapping of transport channels onto physical channels (FDD)", published in Jun. 2003 by the 3GPP.

* cited by examiner

*Primary Examiner*—Duc Nguyen
*Assistant Examiner*—Eric Elcenko
(74) *Attorney, Agent, or Firm*—Sughrue Mion, PLLC

(57) ABSTRACT

The mobile terminal according to the invention comprises: means for receiving synchronization signals from a base station of a radiocommunication system; means for sending towards the base station requests for access to communication resources, at respective instants clamped with respect to instants of reception of said synchronization signals; means for determining a level of remoteness with respect to the base station; and means for advancing the instants of sending of the requests for access to communication resources, as a function of the level of remoteness determined by the means for determining a level of remoteness with respect to the base station.

34 Claims, 2 Drawing Sheets

METHOD OF ACCESSING RESOURCES OF A RADIOCOMMUNICATION SYSTEM, MOBILE TERMINAL AND BASE STATION FOR THE IMPLEMENTATION OF THE METHOD

BACKGROUND OF THE INVENTION

The present invention relates to access to resources of a radiocommunication system. It relates more particularly to access to resources by mobile terminals that are distant from the base stations of the radiocommunication system.

In such radiocommunication systems, such as for example in the UMTS ("Universal Mobile Telecommunication System") system, mobile terminals are devised to communicate with the network by way of at least one base station.

Each base station possesses a zone of radio coverage inside which it can exchange radio signals with terminals. The size of a coverage zone depends on several parameters, such as for example the transmit power of the base station concerned. Specifically, below a certain transmit power, the signals transmitted to a radio terminal will be received too weakly for the latter to be capable of decoding them. The same is true for the uplink: the maximum transmit power of the terminals may represent a limiting factor in respect of the size of the zone where the communication service is possible.

However, other constraints exist in such systems. Some of them may prove to be particularly limiting, so much so that they impose the strictest delimitation on the zones of coverage.

In the UMTS system for example, the tightest constraint is imposed by the access procedure. Each base station in fact possesses reception windows inside which it can detect access requests sent by terminals in corresponding slots of send instants. An access request received by a base station between two successive reception windows will not be detected correctly by the base station.

An access request is characterized initially by the transmission of a preamble of 4096 chips (elementary units for the transmission of binary information) by a mobile terminal. Now, a reception window for such a preamble, corresponding to a "slot" of the PRACH ("Physical Random Access CHannel") random access channel, possesses 5120 chips. There are therefore 1024 (=5120-4096) possible positions for the reception of a preamble. The base station thus performs correlation calculations for the entire set of these 1024 positions, so as to detect the possible presence of an access request inside a reception window.

Given the foregoing, it can be proven that the maximum distance at which a mobile terminal may lie with respect to a base station, in order that the preamble that it sends be received by the base station in the corresponding reception window, is only 40 kilometres. Beyond this limit, the access request made by the mobile terminal will probably not be received in a send window by the base station concerned, and this will prevent the access procedure from continuing: the mobile terminal will therefore not be allocated any communication resource.

In certain cases however, it would be particularly beneficial to be able to extend the zone of coverage of a base station to access for setting up a communication, as much as the other constraints limiting the zone of coverage, in particular during communication, are much less restrictive. An extension of the coverage may turn out to be extremely useful in particular in maritime zones far from coasts, for example to set up an emergency call.

An object of the present invention is to alleviate the limitations of the current technique, by allowing an increase in the size of the zone of coverage of base stations to access.

Another object of the present invention is to allow access to the network of mobile terminals that are distant from the base stations of the radiocommunication network, in certain cases where this turns out to be necessary, for example to set up emergency calls.

SUMMARY OF THE INVENTION

The invention proposes a method of accessing resources of a radiocommunication system comprising at least one base station, from a mobile terminal, the mobile terminal being arranged to send access requests to the base station at respective send instants, the base station being arranged to detect access requests from the mobile terminal in reception windows, each reception window being provided for detection of access requests sent in a corresponding slot of send instants by a mobile terminal situated at a distance from the base station of less than a threshold, the reception window following the corresponding slot of send instants by a reference time interval. The method comprises the steps of:

/a/ determining a level of remoteness of the mobile terminal with respect to the base station;

/b/ conditionally as a function of the level of remoteness determined between the mobile terminal and the base station, using a time interval greater than the reference interval, between the reception windows and the corresponding slots of instants of sending of the access requests by said mobile terminal, so that the base station can detect an access request sent by said mobile terminal, in a reception window following, by said time interval, the corresponding slot for the instant of sending of the access request.

Thus, the time interval used between the reception windows and the corresponding slots of instants of sending of the access requests may be adapted as a function of the level of remoteness of the mobile terminal from the base station. The level of remoteness considered may correspond to various criteria: it may for example correspond to the fact that the terminal is remote from the base station by a distance less than or greater than a distance threshold, or else it may take into account an estimate of the distance which separates the terminal from the base station.

If the distance separating the terminal from the base station is greater than the threshold, then the time interval used will advantageously be greater than the reference interval, so as to allow the base station to detect the terminal's access request, despite the time necessary for the radio signals carrying the access request to arrive at the base station.

The method comprises two alternative embodiments. According to the first embodiment, the use of a time interval greater than the reference interval, between the reception windows and the corresponding slots of instants of sending of the access requests by said mobile terminal, comprises an advancement of the slots of instants of sending of the access requests by said mobile terminal. In this case, it is therefore the mobile terminal which compensates for the additional carriage time introduced by the remoteness of the terminal from the base station. For the base station, everything occurs as if the distance which separates it from the mobile terminal was less than the threshold, on account of the advancement of the access requests by the mobile terminal.

In the second embodiment of the method, the access requests are sent by the mobile terminal with a given signature from among a set of possible signatures, exclusively when the mobile terminal is considered to be remote from the base station by a distance greater than said threshold. Also, the use of a time interval greater than the reference interval, between the reception windows and the corresponding slots of instants of sending of the access requests by said mobile terminal, comprises a shift over time of the reception windows so as to detect the access requests sent with said given signature. Thus, the base station possesses reception windows shifted with a certain delay with respect to the conventional reception windows, so as to detect therein access requests transmitted by remote terminals and using a predetermined particular signature.

The invention also proposes a mobile terminal in accordance with the first embodiment of the method and comprising:
  means for receiving synchronization signals from a base station of a radiocommunication system;
  means for sending towards the base station requests for access to communication resources, at respective instants clamped with respect to instants of reception of said synchronization signals;
  means for determining a level of remoteness with respect to the base station; and
  means for advancing the instants of sending of the requests for access to communication resources, as a function of the level of remoteness determined by the means for determining a level of remoteness with respect to the base station.

The invention further proposes a mobile terminal in accordance with the second embodiment of the method, comprising:
  means for receiving synchronization signals from a base station of a radiocommunication system;
  means for sending towards the base station requests for access to communication resources, at respective instants clamped with respect to instants of reception of said synchronization signals, the access requests comprising a signature from among a set of possible signatures;
  means for determining a level of remoteness with respect to the base station.

Such mobile terminal further comprises means for choosing a signature from among the set of possible signatures so as to send access requests comprising said signature, as a function of the level of remoteness determined by the means for determining a level of remoteness with respect to the base station.

The invention further proposes a base station of a radiocommunication system, in accordance with the second embodiment of the method, comprising:
  means for sending synchronization signals to mobile terminals;
  means for detecting access requests sent by mobile terminals, in reception windows belonging to a set from among at least a first and a second set of reception windows, the access requests comprising a signature from among a set of possible signatures.

The reception windows of the first set are clamped with respect to respective instants of sending of the synchronization signals, and the reception windows of the second set are shifted over time with a delay with respect to the reception windows of the first set.

The means for detecting access requests sent by mobile terminals comprise means for detecting access requests comprising at least one given signature from among the set of possible signatures in the reception windows of the second set, and means for detecting access requests comprising a signature other than said given signature in the reception windows of the first set.

In an advantageous embodiment of the invention, the modifications of the time interval separating the reception windows from the corresponding slots of instants of sending of the access requests are performed only when these access requests are aimed at setting up an emergency call.

DESCRIPTION OF PREFERRED EMBODIMENTS

The discussion below takes place within the context of the UMTS radiocommunication system although without thereby restricting the scope of the invention, applicable to other systems.

The access procedure consists firstly, in respect of a mobile terminal, called a UE ("User Element"), in transmitting to the network, on an up PRACH channel, a preamble. This message is despatched at the start of a time interval or "slot" of 1.33 ms, as illustrated for example in FIG. 1, where the preamble is sent on the PRACH right from the start of slot 12 by the UE.

The preamble comprises 4096 chips and consists of 256 repetitions of a code called the signature, 16 chips long, which is chosen from a set of 16 available signatures. The signatures are Hadamard codes. The formulation of these codes may be found in Section 4.3.3 of Technical Specification TS 25.213, Version 3.7.0, published in December 2001 by the 3GPP. A UE knows the signatures and the slots of the PRACH channel that it can use to request access to a Node B, since this information is broadcast by the Node B on the synchronization channel SCH.

From the standpoint of the radiocommunication network, each base station of the system, or Node B according to the terminology used in the UMTS system, seeks to detect whether such a preamble has been received from a UE. To do this, it performs, as indicated in the introduction and in a manner known per se, calculations of correlation between the signals it detects and the sequences of possible preambles, for the various reception positions inside a reception window corresponding to a slot of the PRACH channel (5120 chips). The reception of an access request is detected when the correlation calculations of the Node B indicate that a digital sequence received is that of a preamble sent on the PRACH, with a certain level of probability.

If a Node B detects the receipt of a preamble, it responds to the access request of the UE, by transmitting it a positive acknowledgement on the AICH ("Acquisition Indicator Channel") down channel. This acknowledgement exhibits a similar structure to that of the preamble, since it uses a spreading factor equal to 256 and a 16-chip sequence signature. In an exemplary embodiment, a positive acknowledgement on the AICH channel uses a signature identical to the preamble signature, while an acknowledgement using a signature inverted with respect to the RACH preamble signature is negative.

Figure 1:
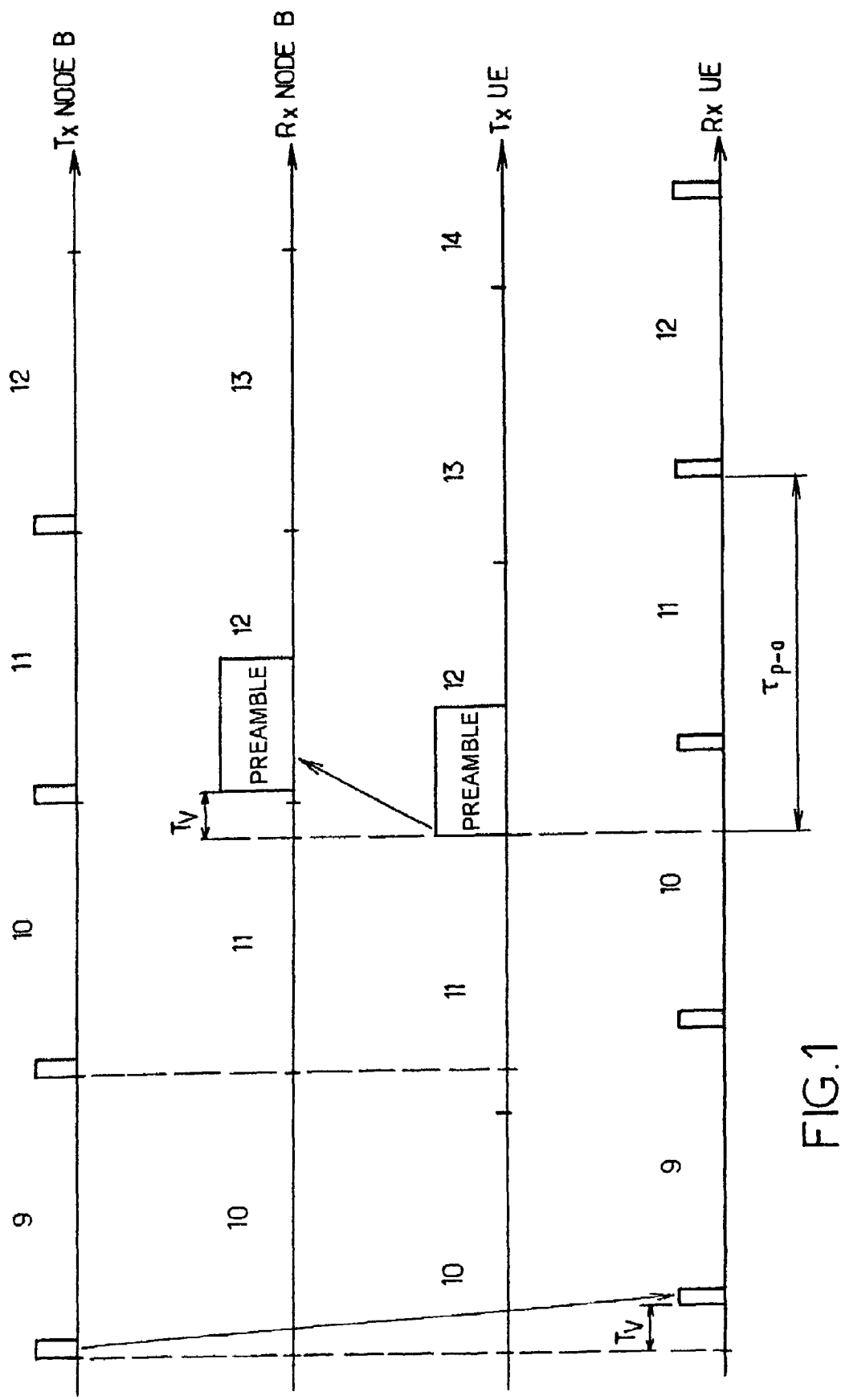
FIG. 1 is a diagrammatic representation of the progress over time of the start of an access procedure.

The AICH channel is moreover aligned temporally with the SCH synchronization down channel, itself divided into 15 slots, and represented on the first line of FIG. 1 (Tx Node B). The synchronization signals sent at the start of each slot on this channel are received by the UE, a time of flight (Tv) after their sending by the Node B.

There exists moreover, in accordance with the Technical Specification 25.211, Version 5.4.0, "Physical channels and mapping of transport channels onto physical channels (FDD)", published in June 2003 by the 3GPP organization (3$^{rd}$ Generation Partnership Project), a time shift of $\tau_{p-a}$ (=7860) chips between the transmission of the random access requests on the PRACH channel and the receipt by the UE of the acknowledgements on the AICH channel. This shift makes it possible to position the send slots of the PRACH channel with respect to the synchronization signals sent on the SCH channel, as is represented in FIG. 1.

In FIG. 1, the Node B receives the preamble transmitted in slot 12 of the PRACH by the UE (line Tx UE), in a reception-window corresponding to slot 12 of the PRACH channel (line Rx Node B). In the example illustrated, the flight time (Tv) between the UE and the Node B is small enough for the preamble transmitted by the UE to be received by the Node B inside the corresponding reception window. Stated otherwise, the UE is situated at a distance of less than 40 km from the Node B. Therefore, it will be possible for the Node B to detect the receipt of this preamble, and subsequently to transmit an acknowledgement to the UE requesting access.

If the distance separating the UE from the Node B considered is greater than 40 km, the flight time will be too long to allow the preamble transmitted by the UE in a slot of the PRACH to be received by the Node B inside the reception window corresponding to this slot. For example, in FIG. 1, the preamble could be received between the reception windows numbered 12 and 13. Subsequently, no preamble would be detected by the Node B, since this detection is performed on each reception window only. Specifically, a detection of preamble over a period corresponding to more than one reception window, for example to two consecutive reception windows, is not desirable since it would increase the number of possible positions for the receipt of a preamble inside this period, this entailing a considerable increase in the number of correlation calculations to be performed by the Node B.

Let us consider that a reference time interval (which depends on the flight time between the UE and the Node B, in accordance with the foregoing) separates the slots for sending the preamble by the UE from the same windows for receipt of this reception preamble by the Node B. According to the invention, this interval may be modified to obtain a time interval greater than the reference interval conditionally, in particular when the UE is distant from the Node B considered, that is to say in the particular case of the UMTS system, when the UE is situated more than 40 km from the Node B. To modify this time interval, it is possible to alter the instants of sending of the preambles or the instants of receipt of these preambles.

In a first embodiment, the increasing of the time interval results from an advancement of the sending of the preamble by a UE distant from the Node B. For example, when the transmission of the preamble by the UE in slot 12 would normally give rise to receipt of the preamble between the reception windows 12 and 13 at the level of the Node B, the terminal will in reality transmit the preamble with an advance Ta with respect to the start of slot 12. Therefore, the preamble will indeed be received by the Node B inside its reception window 12. If one wishes for example to be able to detect the access requests sent by mobile terminals situated a distance of between 40 and 80 km from the Node B, then Ta will preferably be chosen in such a way that the advancement corresponds to 1024 chips.

In this embodiment, only the UE is aware of its remoteness with respect to the Node B, whereas for the latter, everything occurs as if the UE were less than 40 km away (since seen from the Node B, the preamble is received normally in a reception window). Subsequently, the UE will shift its send and receive windows by the value of Ta, in such a way as always to compensate for the lag introduced by the additional distance to be travelled for the signals that it transmits and receives. The send windows of the UE will be advanced in time by Ta, whereas the reception windows of the UE will be shifted with a delay of Ta. No modification of the send and reception windows is necessary at the Node B level in this case.

According to a second embodiment, the time interval between the send slots and the reception windows for the access preambles is greater than the reference time interval, on account of the temporal shift of certain reception windows at the Node B level. Advantageously, the reception windows thus shifted temporally in a permanent manner correspond to reception windows in which the Node B attempts to detect preambles using one or more particular signatures from among the various possible signatures. Specifically, in this embodiment, one or more signatures are used exclusively to code the preambles emanating from UEs that are more than 40 km distant from the Node B.

At the Node B level, there are therefore several sets of reception windows which coexist. A set of reception windows is positioned in time in a conventional manner, that is to say by complying with the reference time interval with respect to the sending of the preambles on the PRACH. This set allows the Node B to detect the preambles sent by UEs close to the Node B with an unreserved signature. Another set of reception windows is shifted temporally with respect to the first set of windows and serves to detect exclusively the preambles containing a signature reserved for the access requests made by UEs that are remote from the Node B.

The Node B receiving, in a window shifted temporally in such a way as to compensate for the increase in the flight time for the distant terminals, a preamble containing a reserved signature, will correctly interpret the receipt of the preamble. The flight time considered by the Node B will be the actual flight time, that is to say the apparent flight time (Tv) plus the value of the time shift used for this window. Subsequently, the signals are exchanged between the UE and the Node B while taking account of this actual flight time.

It is possible to provide a larger number of sets of reception windows for detecting preambles sent by UEs that are more or less remote and comprising respective reserved signatures. These sets of reception windows have mutually differing time shifts so as to allow the detection of access requests by UEs that are more or less remote from the Node B. By way of example, a UE that is 40 to 80 km distant from a Node B will use a first reserved signature, while a UE that is more than 80 km distant from the Node B will use a second reserved signature. The reception windows on which the preambles using the first signature are detected are shifted by 1024 chips temporally with respect to the conventional reception windows, and those for the reception of the preambles using the second signature have a shift of 2048 chips. As a function of the window over which the Node B detects a preamble and as a function of the signature used for this preamble, an approximation of the remoteness of the UE requesting access will then be available to the Node B. This nevertheless presupposes a fairly accurate knowledge of the distance which separates the UE from the Node B, which may be acquired for example according to one of the processes described further on.

In an advantageous embodiment, the choice of a time interval between the slots for sending and for receiving the access requests is performed in a conditional manner, according to other criteria, in addition to the distance separating the UE from the Node B.

In particular, distant access may be reserved for UEs that are attempting to set up an emergency call. For this purpose, the UE considered can advance its sending of the preamble according to the first embodiment described of the invention, or else use a signature reserved for distant emergency calls according to the second embodiment of the invention, only when the access request corresponds to the setting up of an emergency call.

To determine whether a UE is distant from a Node B, in particular whether it is a distance of greater than 40 km away, diverse means are available to the UE, according to the accuracy sought.

It can for example deduce its remoteness from the analysis of certain parameters. In particular, the UE can calculate the reception power of the signals that it receives from the Node B, in a manner known per se. Thus, a signal received with a weak power may be interpreted by the UE as emanating from a Node B situated a large distance from it. A propagation profile can also be set up in a manner likewise known per se. The analysis of this propagation profile by the UE then leads to the determination of a remoteness with respect to the Node B. For example, if the analysis of the propagation profile reveals the presence of a reduced number of propagation paths, the paths exhibiting significant delays, this may be interpreted as the sign of a large distance between the UE and the Node B. The various abovementioned parameters will advantageously be calculated on the basis of the estimation of the data received on the CPICH common physical channel ("Common Pilot CHannel") sent by the Node B and comprising a symbol string known to the UE.

If the signals of several Nodes B are received by the UE, the latter can advantageously combine parameters arising from these various Nodes B. For example, if the UE receives a signal of very weak power on each of the common channels sent by the Nodes B, it can deduce therefrom that it is a significant distance away from the entire set of Nodes B of the network. On the other hand, if one or more signals are received with strong power from certain Nodes B, the UE will without doubt be close to these Nodes B. A power threshold may be used to determine whether the remoteness of the UE with respect to a Node B is greater than 40 km.

Figure 2:
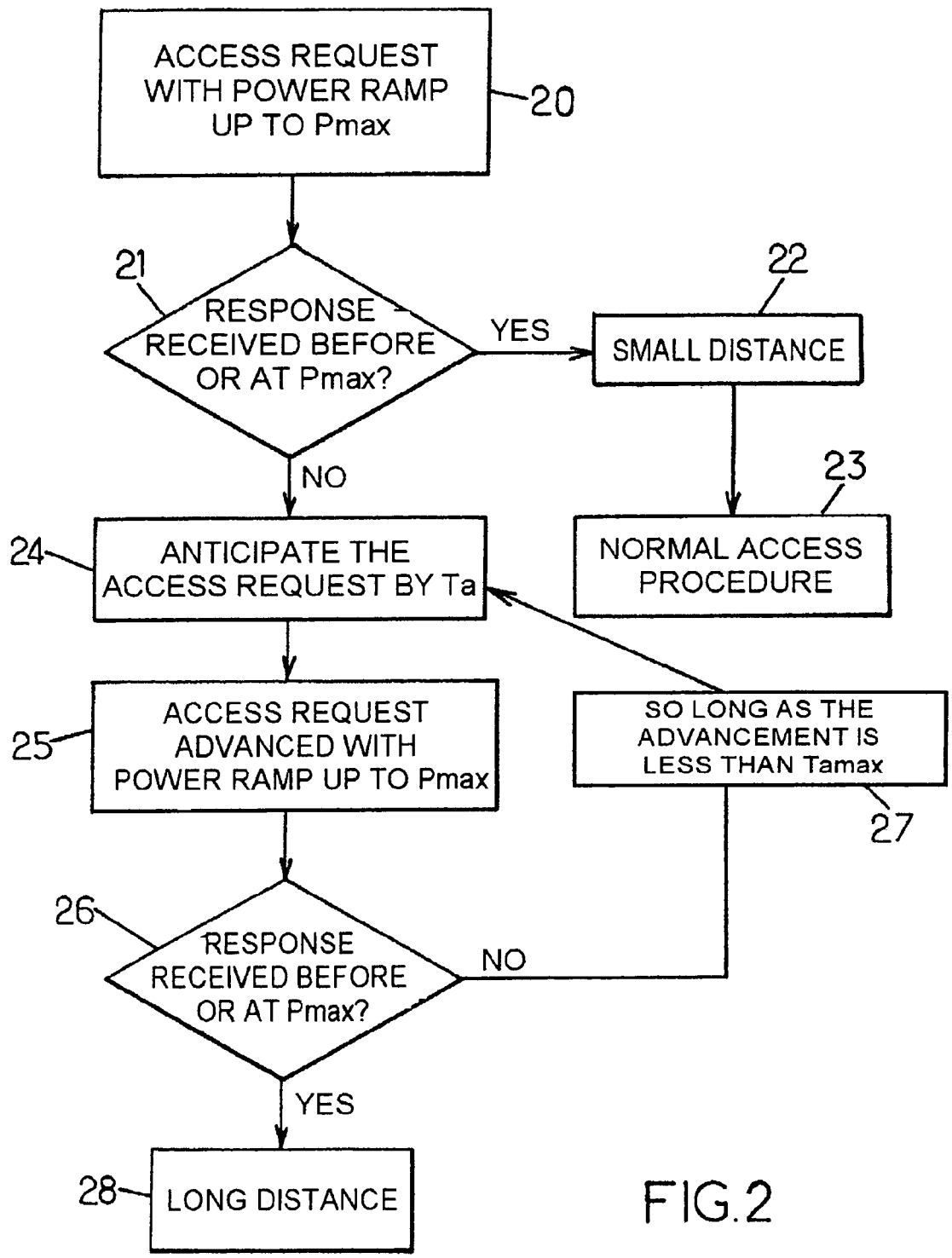
FIG. 2 is a flowchart diagrammatically showing the steps of a process for evaluating the distance between a mobile terminal and a base station according to one embodiment of the invention.

Another embodiment, illustrated in FIG. 2, may advantageously be implemented to determine the remoteness of a UE from a Node B, for the purpose of determining whether the access procedure adapted to remote accesses, as described above, does or does not have to be performed.

According to this embodiment, the UE wishing to access the network begins by making a conventional access request through the transmission of a preamble on the PRACH channel, as indicated above. A power ramp may be used by the UE to regularly retransmit the preamble with, for each new transmission, a transmit power that is increased with respect to the previous transmission, as long as its access request has not been responded to (step 20). This process makes it possible to improve the detection of the preamble by the Node B concerned, in particular in the case where the weak transmit power of the first transmissions is responsible for the absence of detection on the PRACH. This course of action may be repeated until the UE attains a predetermined maximum transmit power $P_{max}$.

If a response is received by the UE during this step, that is to say if the UE receives a positive acknowledgement on the AICH in response to the request sent on the PRACH with a power less than or equal to $P_{max}$, this signifies that, under normal send conditions, it is possible for the Node B to detect the preamble sent by the UE. Stated otherwise, the UE is situated a sufficiently small distance away from the Node B, that is to say typically less than 40 km away from the Node B (step 22). In this typical case, the access procedure can be continued normally (step 23), that is to say the UE will transmit an access message to the Node B following on from the preamble (see paragraph 5.2.2.1.3 of the aforementioned Technical Specification 25.211), then the Node B will allocate communication resources to the UE.

Conversely, if no response is received by the UE after it has sent a preamble with maximum power $P_{max}$, or even a set of preambles according to a power ramp up to $P_{max}$, the UE then repeats its access request on the PRACH channel, advancing this request by a value of an advance Ta, with respect to the start of the send slot on the PRACH, such as determined consistently with the synchronization provided by the Node B, as described above (step 24). This new transmission of the preamble can be done directly at maximum power $P_{max}$ or else at reduced power, then repeated with a power boosted according to a power ramp, possibly up to as much as $P_{max}$ as in the previous case.

The time advance Ta used to bring forward the new access request depends on the accuracy that one wishes to have with regard to the distance separating the UE from the Node B. In an advantageous embodiment, Ta corresponds to an advance of 1024 chips, so much so that the new access request will be detected by the Node B, if the UE is between 40 and 80 km from the Node B considered.

If a response to the new request is received by the UE from the Node B (step 26), in the form of a positive acknowledgement for example, this signifies that the digital sequence of the preamble has indeed been detected by the Node B in one of its reception windows. The time of flight between the UE and the Node B is therefore such that the preamble sent with an advancement of Ta will be received in a reception window of the Node B, that is to say the UE is indeed situated in the distance bracket associated with the advancement of Ta, i.e. for example 40-80 km for an advancement of the send slots of 1024 chips. On receipt of the acknowledgement, the UE may then consider itself as distant from the Node B in a distance slot consistent with the advancement Ta (step 28).

Conversely, in the case where no response is received to the advanced access request of the UE, even with a maximum transmit power $P_{max}$, the advancement may be increased again by the value Ta, to cover a greater distance slot than in the previous case (step 24). A new access request will again be made by the UE, but with an advancement of 2.Ta.

After a number n of repetitions of steps 24 and 27 of the flowchart illustrated in FIG. 2, that is to say after a number n of advancements carried out for the preamble send slots, without the UE having received any acknowledgement on the part of the Node B, the time advance attains the value n.Ta.

As long as n.Ta has a value less than a maximum advancement value $Ta_{max}$, a new advancement may be performed for a new access request by the UE, in accordance with what is described above. When the value $Ta_{max}$ is attained, the access procedure is halted. Advantageously $Ta_{max}$ corresponds to an advancement of the PRACH send slots by a value of less than 5120 chips, so as not to end up in a situation where the reception window thus advanced is substituted for the reception window which precedes it in normal time. For example, $Ta_{max}$ may correspond to an advancement of 4906 (=5120-1024) chips, this making it possible to cover the 160-200 km distance slot. It is of course possible to fix a smaller maximum advancement. Such a method may then make it possible, after a certain number of repetitions of the preamble that are regularly advanced by an advance Ta, to detect an access request sent by a UE lying in a radius of 200 km from the Node B.

Other variants of this mode of determining the distance are also possible, for example by not advancing each new access request by the same advancement value Ta, or else by covering only certain determined distance slots.

On completion of the above steps, the UE will advance its send windows in respect of its access requests on the PRACH channel by the value n.Ta, then it will advance its send windows and will introduce a delay into its reception window of the same value n.Ta in respect of its exchanges of traffic or of data with the Node B, according to one embodiment of the invention. According to the alternative embodiment of the invention, the UE will use a particular signature for its preamble, so that it is received at the Node B in a reception window shifted temporally by n.Ta with respect to the conventional reception windows.

The knowledge of the advancements or of the shifts of windows thus makes it possible to ensure correct setting up and correct maintaining of dedicated channels for the transmission of voice traffic or data.

According to an advantageous embodiment, after having acquired an approximate knowledge of the distance which separates it from the Node B, for example by virtue of the method illustrated in FIG. 2, the UE transmits to the Node B an indication relating to this approximation of the distance. This may be achieved by transmitting to the Node B, the number n of loops performed in the above method, in the access message which follows the receipt of a positive acknowledgement by the UE. This indication may then be utilized by the network, for example for the purposes of locating the UE.

When locating means, for example a receiver based on the GPS ("Global Positioning System") satellite positioning system, are available to the actual UE considered, it can advantageously transmit the evaluation that it has made of its position to the Node B. This transmission may be performed for example by inserting the evaluation of the position of the UE into the message transmitted on the PRACH random access channel, subsequent to the acknowledgement of the access preamble.

We claim:

1. A method of accessing resources of a radiocommunication system comprising at least one base station, from a mobile terminal, the mobile terminal being arranged to sent access requests to the base station at respective send instants, the base station being arranged to detect access requests from the mobile terminal in reception windows, each reception window being provided for detection of access requests sent in a corresponding slot of send instants by a mobile terminal situated at a distance from the base station of less than a threshold, the reception window following the corresponding slot of send instants by a reference time interval, the method comprising the steps of:
   (a) determining a level of remoteness of the mobile terminal with respect to the base station; and
   (b) conditionally as a function of the level of remoteness determined between the mobile terminal and the base station, using a time interval greater than the reference interval, between the reception windows and the corresponding slots of instants of sending of the access requests by said mobile terminal, so that the base station can detect an access request sent by said mobile terminal, in a reception window following, by said time interval, the corresponding slot for the instant of sending of the access request,
   wherein the access requests are sent by the mobile terminal with a given reserved signature from among a set of possible reserved signatures, exclusively when the mobile terminal is considered to be remote from the base station by a distance greater than said threshold, and wherein the use of the time interval greater than the reference interval, between the reception windows and the corresponding slots of instants of sending the of the access requests by said mobile terminal, comprises a shift over time of the reception windows so as to detect the access requests sent with said given reserved signature, and in case the mobile terminal is considered to be within the threshold distance from the base station, then the access requests are sent with an unreserved signature and detected in an unshifted reception window.

2. The method as claimed in claim 1, wherein step (b) is carried out when the determination of the level of remoteness of the mobile terminal with respect to the base station indicated that the mobile terminal is situated at a distance from the base station greater than said threshold.

3. The method as claimed in claim 1, wherein the use of a time interval greater than the reference interval, between the reception windows and the corresponding slots of instants of sending of the access requests by said mobile terminal, comprises an advancement of the slots of instants of sending of the access requests by said mobile terminal.

4. The method as claimed in claim 1, wherein said time interval used between the reception windows and the corresponding slots of instants of sending of the access requests by said mobile terminal, depends on the distance between the mobile terminal and the base station.

5. The method as claimed in claim 1, wherein said time interval used between the reception windows and the corresponding slots of instants of sending of the access requests by said mobile terminal, is greater than the reference time interval by a smaller value than the duration of a reception window.

6. The method as claimed in claim 1, wherein the determination of the level of remoteness of the mobile terminal with respect to the base station comprises an estimation by the mobile terminal of a parameter at least from among: a level of power of a signal received from the base station, a profile of propagation between the mobile terminal and the base station, propagation delays between the mobile terminal and the base station, a level of power of signals received respectively from a set of base stations.

7. The method as claimed in claim 1, wherein the determination of the level of remoteness of the mobile terminal with respect to the base station comprises the steps of:
   (c) sending an access request at an instant of sending from the mobile terminal, so that said request can be detected by the base station in a corresponding reception window;
   (d) if no response to the access request has been received at the mobile terminal, repeating the sending of an access request at a send instant advanced with respect to the corresponding reception window; and
   (e) deducing that the mobile terminal is at a distance from the base station greater than said threshold, if a response to the access request is received at the mobile terminal on completion of step (d).

8. The method as claimed in claim 1, wherein the determination of the level of remoteness of the mobile terminal with respect to the base station comprises the steps of:
(f) sending an access request at an instant of sending from the mobile terminal, so that said request can be detected by the base station in a corresponding reception window;
(g) if no response to the access request has been received at the mobile terminal, repeating the sending of an access request at a send instant advanced with respect to the corresponding reception window;
(h) repeating step (g) by again advancing the instant of sending with respect to the corresponding reception window, as long as no response to the access request has been received at the mobile terminal and that a maximum advancement has not been attained for the instant of sending of the access request; and
(i) deducing an estimation of the distance between the mobile terminal and the base station, on the basis of a number of repetitions performed of step (g).

9. The method as claimed in claim 1,
wherein step (b) is carried out only when the access request is for setting up an emergency call.

10. The method as claimed in claim 1, wherein the level of remoteness of the mobile terminal with respect to the base station is determined by the mobile terminal and transmitted to the base station in view of a subsequent processing.

11. The method as claimed in claim 1, wherein the mobile terminal is able to evaluate its geographical position, and wherein the mobile terminal transmits the valuated geographical position to the base station in an access message.

12. A mobile terminal comprising:
means for receiving synchronization signals from a base station of a radiocommunication system;
means for sending towards the base station requests for access to communication resources, at respective instants clamped with respect to instants of reception of said synchronization signals, the access requests comprising a signature from among a set of possible reserved signatures;
means for determining a level of remoteness with respect to the base station; and
means for advancing the instants of sending the requests for access to communication resources, as a function of the level of remoteness determined by the means for determining a level of remoteness with respect to the base station; and
means for choosing a signature from among the set of possible reserved signatures so as to send access requests comprising said reserved signature, as a function of the level of remoteness determined by the means for determining a level of remoteness with respect to the base station.

13. The mobile terminal as claimed in claim 12, wherein the means for advancing the instants of sending of the requests for access to communication resources, advance said instants of sending of the access requests when the means for determining a level of remoteness with respect to the base station indicate that the mobile terminal is remote from the base station by a distance greater than a threshold.

14. The mobile terminal as claimed in claim 12, wherein the means for determining a level of remoteness with respect to the base station comprise means for estimating a distance between the mobile terminal and the base station, and wherein the advancement preformed by the means for advancing the instants of sending of the requests for access to communication resources, depends on the estimated distance between the mobile terminal and the base station.

15. The mobile terminal as claimed in claim 12, wherein the means for determining a level of remoteness with respect to the base station comprise means for estimating a parameter at least form among: a level of power of a signal received from the base station, a profile of propagation between the mobile terminal and the base station, propagation delays between the mobile terminal and the base station, a level of power of signals received respectively from a set of base stations of the radiocommunication system.

16. The mobile terminal as claimed in claim 12, wherein the means for determining a level of remoteness with respect to the base station comprise:
means for sending towards the base station a request for access to communication resources, at an instant of sending clamped with respect to a respective instant of reception of a synchronization signal sent by the base station;
means for repeating the sending of an access request in an advanced manner, if no response to the access request has been received at the mobile terminal;
means for deducing that the mobile terminal is at a distance from the base station greater than a threshold, if a response to the access request is received at the mobile terminal on completion of the repetition of the access request in advanced fashion.

17. The mobile terminal as claimed in claim 12, wherein the means for determining a level of remoteness with respect to the base station comprise:
means for sending towards the base station a request for access to communication resources, at an instant of sending clamped with respect to a respective instant of reception of a synchronization signal sent by the base station;
means for repeating the sending an access request while each time advancing the instant of sending of the access request, as long as no response to the access request has been received at the mobile terminal and that a maximum advancement has not been attained; means for deducing an estimate of the distance between the mobile terminal and the base station on the basis of a number of repetitions performed by said means fro repeating the sending of an access request while each time advancing the instant of sending of the access request.

18. The mobile terminal as claimed in claim 12, further comprising means for transmitting to the base station a cue relating to the level of remoteness determined by the means for determining a level of remoteness with respect to the base station.

19. The mobile terminal as claimed in claim 12, further comprising means for evaluating a geographical position thereof, and means for transmitting the valuated geographical position to the base station in an access message.

20. A base station for a radiocommunication system, comprising:
means for sending synchronization signals to mobile terminals; and
means for detecting requests for access to communication resources, sent by mobile terminals, in reception windows belonging to a set from among at least a first and a second set of reception windows, the access requests comprising a signature from among a set of possible signatures,
wherein the reception windows of the first set are clamped with respect to respective instants of sending of the synchronization signals, and the reception windows of the second set are shifted over time with a delay with respect to the reception windows of the first set, and wherein the means fro detecting access request sent by mobile terminals comprise means for detecting access requests comprising at least one given reserved signature from among the set of possible reserved signatures n the reception windows of the second set, and means for detecting access requests comprising an unreserved signature other than said given reserved signature in the reception windows of the first set, wherein the reserved signatures are exclusively for mobile terminals considered to be remote from the base station by a distance greater than a predefined threshold.

21. The method as claimed in claim 9, wherein step (b) is carried out when the determination of the level of remoteness of the mobile terminal with respect to the base station indicated that the mobile terminal is situated at a distance from the base station greater than said threshold.

22. The method as claimed in claim 9, wherein the use of a time interval greater than the reference interval, between the reception windows and the corresponding slots of instants of sending the access requests by said mobile terminal, comprises an advancement of the slots of instants of sending of the access requests by said mobile terminal.

23. The method as claimed in claim 9, wherein said time interval used between the reception windows and the corresponding slots of instants of sending of the access requests by said mobile terminal, depends on the distance between the mobile terminal and the base station.

24. The method as claimed in claim 9, wherein said time interval used between the reception windows and the corresponding slots of instants of sending of the access requests by said mobile terminal, is greater than the reference time interval by a smaller value than the duration of a reception window.

25. The method as claimed in claim 9, wherein the determination of the level of remoteness of the mobile terminal with respect to the base station comprises an estimation by the mobile terminal of a parameter of least from along: a level of power of a signal received from the base station, a profile of propagation between the mobile terminal and the base station, propagation delays between the mobile terminal and the base station, a level of power of signals received respectively from a set of base stations.

26. The method as claimed in claim 9, wherein the determination of the level of remoteness of the mobile terminal with respect to the base station comprises the steps of:

(c) sending an access request at an instant of sending from the mobile terminal, so that said request can be detected by the base station in a corresponding reception window;

(d) if no response to the access request has been received at the mobile terminal, repeating the sending of an access request at a send instant advanced with respect to the corresponding reception window; and (e) deducing that the mobile terminal is at a distance from the base station greater than said threshold, if a response to the access request is received at the mobile terminal on completion step (d).

27. The method as claimed in claim 9, wherein the determination of the level of remoteness of the mobile terminal with respect to the base station comprises the steps of:

(f) sending an access request at an instant of sending from the mobile terminal, so that said request can be detected by the base station in a corresponding reception window;

(g) if no response to the access request has been received at the mobile terminal, repeating the sending of an access request at a send instant advanced with respect to the corresponding reception window;

(h) repeating step (g) by again advancing the instant of sending with respect to the corresponding reception window, as long as no response to the access request has been received at the mobile terminal and that a maximum advancement has not been attained from the instant of sending of the access request; and (i) deducing an estimation of the distance between the mobile terminal and the base station, on the basis of a number of repetitions performed of step (g).

28. The method as claimed in claim 9, wherein the level of remoteness of the mobile terminal with respect to the base station is determined by the mobile terminal and transmitted to the base station in view of a subsequent processing.

29. The method as claimed in claim 9, wherein the mobile terminal is able to evaluate its geographical position, and wherein the mobile terminal transmits evaluated the geographical position has to the base station in an access message.

30. The method as claimed in claim 9, wherein the access requests are sent by the mobile terminal with a given reserved signature from among a set of possible reserved signature, exclusively when the mobile terminal is considered to be remote from the base station by a distance greater than said threshold, and wherein the use of the time interval greater than the reference interval, between the reception windows and the corresponding slots of instants of sending of the access requests by said mobile terminal, comprises a shift over time of the reception windows so as to detect the access requests sent with said given reserved signature, and in case the mobile terminal is considered to be within the threshold distance from the base station, then the access requests are sent with an unreserved signature and detected in an unshifted reception window.

31. The method as claimed in claim 12, wherein the access requests are sent by the mobile terminal with a given reserved signature from among a set of possible reserved signatures, exclusively when the mobile terminal is considered to be remote from the base station by a distance greater than said threshold, and wherein the use of the time interval greater than the reference interval, between the reception windows and the corresponding slots of instants of sending of the access requests by said mobile terminal, comprises a shift over time of the reception windows so as to detect the access requests sent with said given reserved signature, and in case the mobile terminal is considered to be within the threshold distance from the base station, then the access requests are sent with unreserved signature and detected in a unshifted reception window.

32. The mobile terminal as claimed in claim 12, wherein said means for advancing the instants of sending of the requests for access to communication resources, as a function of the level of remoteness determined by the means for determining a level of remoteness with respect to the base station, are implemented only when the access requests are for setting up an emergency call.

33. The mobile terminal as claimed in claim 12, wherein the means for determining a level of remoteness with respect to the base station comprise means for determining whether the mobile terminal is remote from the base station by a distance greater than a threshold, and wherein the means for choosing a signature from among the set of possible signatures comprise means for choosing a given signature so as to send access requests comprising said given signature, exclusively when the means for determining a level of remoteness with respect to the base station indicate that the mobile terminal is remote from the base station by a distance greater than said threshold.

34. The mobile terminal as claimed in claim 12, wherein said means for choosing a signature from among the set of possible reserved signatures so as to send access requests comprising said reserved signature, as a function of the level of remoteness determined by the means for determining a level of remoteness with respect to the base station, are implemented only when the access requests are aimed at setting up an emergency call.

* * * * *